Oct. 2, 1934.  H. FÖTTINGER  1,975,505
FILLING DEVICE FOR HYDRAULIC GEARS
Filed March 10, 1933
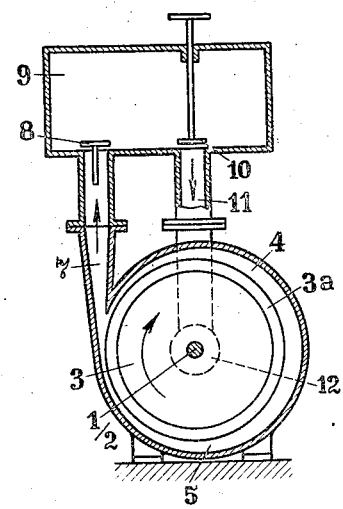
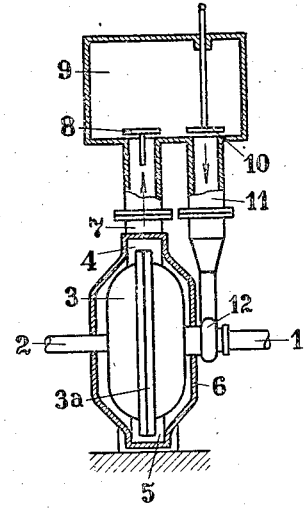
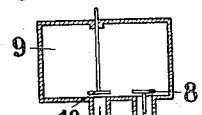
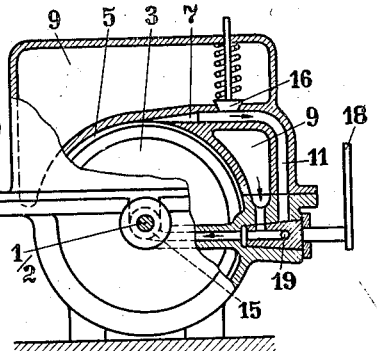
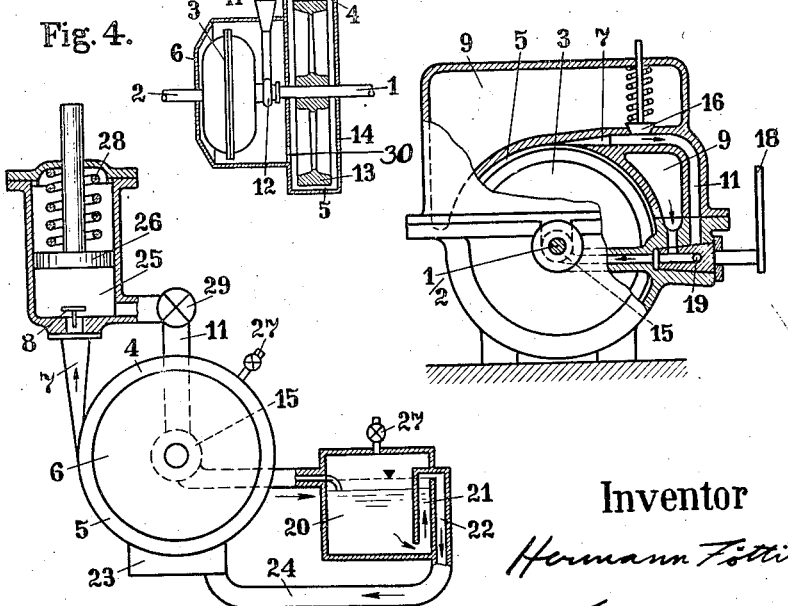
Inventor
Hermann Föttinger Patented Oct. 2, 1934

1,975,505

UNITED STATES PATENT OFFICE 1,975,505

FILLING DEVICE FOR HYDRAULIC GEARS

Hermann Föttinger, Berlin-Wilmersdorf, Germany

Application March 10, 1933, Serial No. 660,289
In Germany March 10, 1932

8 Claims. (Cl. 60—54)

This invention relates to the filling, transmission and evacuation of the working liquid in hydraulic gears having a driving vane wheel and a facing driven vane wheel of the well known type. Hitherto for this purpose specially connected or independent pumps, overhead tanks, or accumulators have been applied for filling, transmitting, refilling leakage liquid or stopping the operation of the gear or gears.

The object of the invention is to simplify the construction of these auxiliary devices and to render more economical the use of hydraulic gears, more particularly of the turbo-transformer type, for the transmission of small power, for instance in rail and road motor cars.

The object is attained by the application of one or more friction pumps intended to be used as filling or operating pumps and so designed that the liquid leaving the gear is forced into accumulators, overhead tanks or, in multiple gear plants, into another gear, not by impellers or piston pumps but by the laminary or turbulent friction on the walls of rotating parts already existing in the plant.

This affords the advantage that special or separate pumps may fully be dispensed with and that any parts rotating at high speed and already existing in the gear plant, such as engine flywheels, wheels of the barring gear, outside flanges or other elements of the rotating parts themselves (clutches or reduction gear) can be used for removing and compressing the working liquid.

Other objects will be developed from the following detailed description of the device and the claims.

A number of embodiments of the invention has diagrammatically been represented by way of examples in the accompanying drawing, which forms a part of this specification and in which—

Fig. 1 is a vertical sectional elevation of a hydraulic power transmitting gear combined with a friction pump according to the invention;

Fig. 2 is another vertical section of the gear on a plane approximately made at right angles to that of Fig. 1;

Fig. 3 is a side elevation, partly in section, of another embodiment comprising a multiple-way circuit;

Fig. 4 is a side elevation and partial sectional view of a further embodiment of the gear and pump with additional parts; and Fig. 5 is a front elevation, partly in section, of a gear, a flywheel and a friction pump combined with a flywheel.

Like numerals indicate like or similar parts throughout all figures of the drawing.

Figs. 1 and 2 diagrammatically show how the liquid is moved simply by the friction of the walls of parts existing, said parts being at the same time used as the rotating active means of a friction pump. With the primary shaft 1 is coupled the rotating part 3 of a hydraulic power transmitting gear, such as disclosed in applicant's U. S. patents, Nos. 1,199,359, 1,199,360 and 1,199,364, for example, within which one or more vane wheels coupled with the secondary shaft 2 rotate. In some instances, the part 3 may also be coupled with the secondary shaft 2 in which case the primary or driving wheel or wheels are housed in the part 3 and coupled with the shaft 1. Encircling the part 3 is a protective casing 6 which forms a pressure generating pump channel 4—5 spaced at a small distance from the periphery of said part 3 and extending eccentrically therewith. This pressure channel, collecting leaking liquid and the working liquid evacuated from part 3 and having a diffuser-like connection or nozzle 7, leads the liquid through a check valve 8, through the intermediary of an overhead tank 9, forming also an air chamber, the liquid returning to the rotating parts of the gear 3 through a controlling device 10, a pipe 11 and an inlet chamber 12.

When the hydraulic gear 3 has been emptied into the casing 6 through well known discharge ports, the liquid entering the pressure channel 4—5 will at once be forced through the diffuser 7 into the storage and distributing vessel 9 by the powerful turbulence friction of the flanges 3a, connecting bolts, discharge means etc. rotating at high speed with the housing 3 without requiring special vanes, blades or similar raising members which are liable to produce objectionable friction, splashing and ventilation.

In the embodiment shown by Fig. 3 the liquid discharged from the gear 3 and the leaking liquid is received in the eccentric annular channel 4—5 having a reduced cross section towards its outlet end near the diffuser 7 and is placed under pressure therein whereupon it is forced through the diffuser 7 partly directly to the filling point 15 of the rotating gear 3 and partly through a safety valve 16 into a closed storage or feeding vessel 9. Operation or control of the filling appliance may be accomplished, e. g., by a controlling device, constructed as a three way-cock 18, 19, which feeds the liquid directly from the friction pump through the duct 11 or from the storage vessel 9 or which can be operated to completely shut off the said liquid.

In order that continuous loss by friction is avoided, the movement of the liquid may also be accomplished intermittingly at intervals. For instance, the lower part of the annular channel 5 (Fig. 4) may be designed with an enlarged receiver or sump 23 in such a way that a certain quantity of the liquid must first be collected before the same is allowed to get into contact with the gear 3 or other rotating member, (e. g., a flywheel or barring wheel). As soon as this contact takes place the surface of the liquid is so substantially troubled that on account of the oscillations, waves or other motions produced the largest amount of the quantity collected is raised through the diffuser 7 into a storage vessel. This occurs by a few revolutions of the gear in a fraction of a second. The next moment the gear then runs again entirely in air, that is, with a minimum of ventilating and centrifugal effect. This method of operation, even in the case of highest speeds, eliminates, as much as possible, the hitherto unavoidable losses.

The principle of periodic removal of the liquid may further also be realized by means of an auxiliary vessel 20 (Fig. 4) provided with a built-in siphon 21, 22 and which collects the liquid leaking from the pump housing, along the pump shaft at the filling inlet 15 until the apex of the siphon 21 has been filled. Immediately thereupon the descending branch 22 of the said siphon will also be filled with the overflowing liquid and the complete contents of the collector 20 will be discharged through a connecting pipe 24 to a lower point of the casing 6, e. g., into the sump 23. Valves 27 for supplying and evacuating the air can be arranged at suitable points as shown.

The arrangement may also be so devised that the liquid under pressure leaving the diffuser 7 is forced into an accumulator 25 (Fig. 4) comprising a cylinder with a check valve 8, a piston 26 and a spring 28. The said spring forces the liquid continuously or intermittingly, as required, through a suitable valve 29 back into the hydraulic gear.

Fig. 5 illustrates a modification in which the friction pump is combined with the flywheel 13 of the gear 3, which flywheel 13 is enclosed in a casing 14 comprising the pump channel 4—5 into which the leaking and discharged liquid is drained from the housing 6 through apertures 30. All other details may correspond to any of the above-described constructions.

Without departing from the spirit of the invention, the several details shown by way of example may be replaced by equivalent ones.

What I claim is:—

1. In combination with a hydraulic gear, a member rotatable in accordance with the operation of said gear, a channel surrounding the periphery of said member, eccentrically mounted with respect to said member to form a substantially crescentic pressure pump chamber therewith, and adapted to receive working liquid from said hydraulic gear, said channel having an outlet at the peripheral portion thereof nearest to the periphery of said rotatable member, and means for delivering liquid from said outlet into the interior of said hydraulic gear to supply working liquid to said gear.

2. In combination with a hydraulic gear, a member rotatable in accordance with the operation of said gear, a channel surrounding the periphery of said member, adapted to receive the working liquid from said hydraulic gear, and eccentrically mounted with respect to said member to form a substantially crescentic pressure pump chamber, said channel having an outlet at the peripheral portion thereof nearest to the periphery of said rotatable member, a storage chamber, connections between said outlet and said storage chamber for delivering liquid from said pump chamber into said storage chamber, said storage chamber being provided with an outlet, a connection between said storage chamber outlet and the interior of said hydraulic gear for delivering working liquid to said gear, and valve means for controlling the flow of liquid through said last mentioned connection.

3. In combination with a hydraulic gear, a member rotatable with said gear, a stationary casing enclosing said gear and forming a channel in the periphery thereof extending eccentrically with respect to said rotatable member to form a crescentic pressure pump chamber therewith, a diffuser nozzle extending substantially tangentially from the highest pressure section of said pump chamber, a storage tank disposed above said gear, communicating with said nozzle for receiving liquid from said chamber, and having an outlet, a connection between said storage tank outlet and the interior of said hydraulic gear for delivering working liquid from said storage tank to said gear, and valve means for controlling the flow of liquid through said connection.

4. In combination with a hydraulic gear comprising a driving member and a driven member mounted on respective shafts, a fly wheel mounted on one of said shafts, a casing enclosing said hydraulic gear and adapted to receive working liquid from said gear, a channel surrounding the periphery of said fly wheel, eccentrically mounted with respect thereto to form a pressure pump chamber with the periphery thereof, and communicating with the lower portion of said casing, said channel having an outlet substantially in the smallest radial section of said pump chamber, and means for delivering liquid from said outlet into the interior of said hydraulic gear to effect the return of working liquid to said gear.

5. In combination with a hydraulic gear having a peripheral rotatable member enclosing the working circuit of said gear and forming an annular radially outwardly extending flange, a casing enclosing said rotatable member and having an annular channel portion radially opposite to said flange and extending eccentrically with respect thereto to form a pressure pump chamber therewith, said channel having a tangential outlet conduit at the peripheral portion thereof nearest to said flange, and means for delivering liquid from said conduit into the interior of said hydraulic gear to supply working liquid to said gear.

6. In combination with a hydraulic gear, a member rotatable in accordance with the operation of said gear, a pump pressure channel surrounding the periphery of said member, eccentrically mounted with respect to said member to form a substantially crescentic pressure pump chamber therewith, and adapted to receive working liquid from said hydraulic gear, said channel having an outlet at the peripheral portion thereof nearest to the periphery of said rotatable member, a sump connected to the lowest portion of said channel whereby a substantial portion of the liquid will be collected in said sump before the rotatable member comes in contact therewith, and means for delivering liquid from said outlet into the interior of said hydraulic gear to supply working liquid to said gear.

7. In combination with a hydraulic gear, a member rotatable in accordance with the operation of said gear, a pump pressure channel encircling said rotatable member at a small distance therefrom, and eccentrically mounted with respect thereto to form a pressure pump chamber therewith, a liquid receiver communicating with said channel, means for delivering working liquid to said receiver, and means for automatically evacuating at least a portion of the liquid in said receiver into said pump chamber when the liquid in said receiver reaches a predetermined level.

8. In combination with a hydraulic gear having a liquid inlet, a member rotatable in accordance with the operation of said gear, a channel surrounding the periphery of said member, eccentrically mounted with respect thereto to form a pressure pump chamber therewith, and adapted to receive working liquid from said hydraulic gear, said pump chamber being provided with an outlet, a conduit leading from said outlet to the liquid inlet of said hydraulic gear, a storage tank communicating with the interior of said conduit, valve means for controlling the communication between said conduit and said storage tank, and valve means for controlling the delivery of liquid into said hydraulic gear inlet either directly from said conduit or from said storage tank.

HERMANN FÖTTINGER.